(12) United States Patent
Martin

(10) Patent No.: US 10,876,573 B2
(45) Date of Patent: Dec. 29, 2020

(54) FOIL BEARING PROGNOSTIC HEALTH SENSOR

(71) Applicant: Hamilton Sundstrand Corporation, Charlotte, NC (US)

(72) Inventor: Luke Martin, Enfield, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/396,255

(22) Filed: Apr. 26, 2019

(65) Prior Publication Data

US 2020/0340521 A1   Oct. 29, 2020

(51) Int. Cl.
| | |
|---|---|
| F16C 17/02 | (2006.01) |
| F16C 41/00 | (2006.01) |
| G01M 13/04 | (2019.01) |
| G01M 13/045 | (2019.01) |
| G01K 7/02 | (2006.01) |

(52) U.S. Cl.
CPC ............ *F16C 17/024* (2013.01); *F16C 41/00* (2013.01); *G01M 13/045* (2013.01); *F16C 2233/00* (2013.01); *G01K 7/02* (2013.01)

(58) Field of Classification Search
CPC ...... F16C 17/024; F16C 17/042; F16C 41/00; F16C 41/002; F16C 2233/00; G01M 13/04; G01M 13/045; G01K 7/02
See application file for complete search history.

(56) References Cited

U.S. PATENT DOCUMENTS

| | | | |
|---|---|---|---|
| 6,965,181 B1* | 11/2005 | Heshmat | F16C 17/024 310/90.5 |
| 9,951,820 B2 | 4/2018 | Dowie et al. | |
| 2001/0010438 A1* | 8/2001 | Bouille | F16C 35/067 310/90.5 |
| 2007/0051187 A1* | 3/2007 | McDearmon | F16C 19/522 73/862.322 |
| 2009/0324148 A1* | 12/2009 | Ruggiero | G01D 5/35312 384/103 |

(Continued)

FOREIGN PATENT DOCUMENTS

| | | |
|---|---|---|
| EP | 3045749 A1 | 7/2016 |
| EP | 3299643 A1 | 3/2018 |

(Continued)

OTHER PUBLICATIONS

Machine Translation of JP-2001323893-A (Year: 2001).*
European Search Report for Application No. 19210441.2, dated Jul. 1, 2020, 76 pages.

*Primary Examiner* — Alan B Waits
(74) *Attorney, Agent, or Firm* — Cantor Colburn LLP

(57) ABSTRACT

Disclosed is a foil bearing that includes a housing, a support structure associated with the housing, and a foil circumscribed at least in part by the support structure and spaced from the housing by the support structure. The foil includes a body section having a body material composition. The foil includes a sensor section having a conductive material composition, the sensor section having a circumferential portion surrounded at least in part by the body section. The foil includes a tab section that protrudes into the support structure and defines a first terminal and a second terminal associated with the sensor section.

20 Claims, 4 Drawing Sheets

(56) References Cited

U.S. PATENT DOCUMENTS

| | | | |
|---|---|---|---|
| 2016/0138650 A1* | 5/2016 | McAuliffe | G01M 13/04 |
| | | | 384/103 |
| 2018/0195601 A1 | 7/2018 | Hallman | |
| 2019/0072134 A1 | 3/2019 | Rajendran et al. | |

FOREIGN PATENT DOCUMENTS

| JP | 2001323893 A | * 11/2001 | ............ F16C 17/246 |
|---|---|---|---|
| JP | 2003021137 A | 1/2003 | |
| WO | 2015091728 A1 | 6/2015 | |

* cited by examiner

FOIL BEARING PROGNOSTIC HEALTH SENSOR

BACKGROUND

Exemplary embodiments pertain to the art of foil bearings. External sensors to the foil bearing may provide a variety of diagnostic information. These external sensors are required to be fastened to bearing assemblies in order to obtain the necessary diagnostic information, requiring maintenance, increasing measurement uncertainty, and increasing form factor.

BRIEF DESCRIPTION

Disclosed is a foil bearing that includes a housing, a support structure associated with the housing, and a foil circumscribed at least in part by the support structure and spaced from the housing by the support structure. The foil includes a body section having a body material composition. The foil includes a sensor section having a conductive material composition, the sensor section having a circumferential portion surrounded at least in part by the body section. The foil includes a tab section that protrudes into the support structure and defines a first terminal and a second terminal associated with the sensor section.

In addition to one or more of the features described above, or as an alternative, further embodiments may include that the circumferential portion extends in a circumferential direction about the foil and the tab section is configured to prevent movement of the foil in the circumferential direction about the support structure.

In addition to one or more of the features described above, or as an alternative, further embodiments may include that the conductive material composition includes a first metallic conductor material disposed distinctly from a second conductor material joined to form a thermocouple of the sensor section about the circumferential portion.

In addition to one or more of the features described above, or as an alternative, further embodiments may include that the conductive material composition is homogenous.

In addition to one or more of the features described above, or as an alternative, further embodiments may include that the sensor section forms a speed sensor configured to conduct current induced from magnetic fields.

In addition to one or more of the features described above, or as an alternative, further embodiments may include that the sensor section forms an acceleration sensor configured to generate a voltage from forces imparted on the conductive material composition.

In addition to one or more of the features described above, or as an alternative, further embodiments may include an insulator disposed between the body section and the sensor section.

In addition to one or more of the features described above, or as an alternative, further embodiments may include a body material composition conductivity of the body section is less than 1.0 Siemens per meter at 20° C. and a conductive material composition conductivity of the sensor section is greater than 1.0 Siemens per meter at 20° C.

In addition to one or more of the features described above, or as an alternative, further embodiments may include that the support structure is a bump foil.

Also disclosed is a bearing measurement system that includes a foil having a body section having a body material composition. The system includes a sensor section having a conductive material composition. The sensor section includes a rotor circumscribed by the foil. The system includes a controller operable to receive an electric signal from the sensor section, and responsive to a difference between the electric signal and a normal operating condition exceeding a predetermined threshold, operate the rotor commensurate with the difference.

In addition to one or more of the features described above, or as an alternative, further embodiments may include that the operation of the rotor commensurate with the difference includes stopping the rotor.

In addition to one or more of the features described above, or as an alternative, further embodiments may include that the electric signal is a voltage generated by the sensor section.

In addition to one or more of the features described above, or as an alternative, further embodiments may include that the sensor section forms a thermocouple.

In addition to one or more of the features described above, or as an alternative, further embodiments may include that the normal operating condition is a bearing temperature threshold.

In addition to one or more of the features described above, or as an alternative, further embodiments may include that the sensor section is a solid conductor.

In addition to one or more of the features described above, or as an alternative, further embodiments may include that the normal operating condition is a speed of the rotor.

In addition to one or more of the features described above, or as an alternative, further embodiments may include that the sensor section forms a piezoelectric sensor.

In addition to one or more of the features described above, or as an alternative, further embodiments may include that the normal operating condition is a normal machine vibration threshold.

Also disclosed is a foil bearing that includes a housing, a support structure associated with the housing, and a foil circumscribed at least in part by the support structure and spaced from the housing by the support structure. The foil includes a body section having a body material composition, and a first sensor section having a first conductive material composition. The first sensor section has a first circumferential portion surrounded at least in part by the body section. The second sensor section has a second conductive material composition. The second sensor section has a second circumferential portion surrounded at least in part by the body section. The foil includes a third sensor section having a third conductive material composition. The third sensor section includes a third circumferential portion surrounded at least in part by the body section. The third sensor section includes a tab section that protrudes into the support structure and defines respective first terminals and second terminals associated with the first sensor section, the second sensor section, and the third sensor section.

In addition to one or more of the features described above, or as an alternative, further embodiments may include that the first sensor section is parallel to the second sensor section and the first sensor section is parallel to the third sensor section.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Plain bearings or journal bearings are configured to reduce friction between components having relative rotational motion. A foil bearing provides similar results without mechanical contact. For example, a foil bearing or foil-air bearing may create an air pocket between a foil and a rotating rotor to form a bearing therein. Various sensing apparatuses may be disposed on the exterior of the foil housing to ensure proper operation of the rotor and attached machinery. These sensing apparatuses may provide temperature, speed, vibration, and other information to associated controllers. The distance between sensor apparatuses and environment conditions may increase sensor uncertainty and add additional cost.

A foil may be composed of multiple layers formed by a layered process of manufacture. The layers may be additively disposed and welded together. Such processes might include ultrasonic additive manufacturing, laminated object manufacturing, or the like. As such, individual layers of a body material composition may be laid and adhered forming a body section of the foil sheet. A sensor section having a conductive material composition may be laid within one or more of the additive layers to form a conductive wire within or disposed on the body section. As such, an entrained sensor section may encompass the entire circumference of the foil or designated portions thereof—after the foil is formed in a rounding machine.—Indeed, sensory materials may be embedded into a circular foil through various manufacturing processes to form diagnostic sensors therein.

Figure 1:
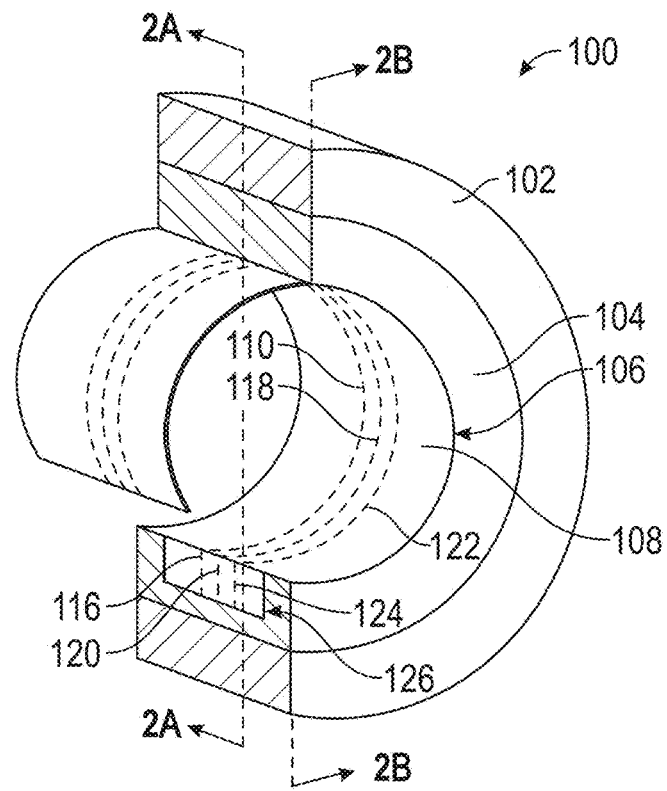
FIG. 1 is a perspective view of a foil bearing.

Referring to FIG. 1, a foil bearing 100 is shown. The foil bearing 100 includes a housing 102. The housing 102 may include legs or stanchions for support. The housing 102 may be part of a larger machine or manufacture. For example, the housing 102 may be part of a turbine, generator, compressor, or other apparatus. The housing 102 may surround a support structure 104. The support structure 104 may be a bump foil or another structural component configured to space the foil 106 from the housing 102. The support structure 104 may include a mesh or web lattice structure. The foil 106 is comprised of a body section 108 having a body material composition. The body material composition may include any number of materials. The body material composition may have a body material composition conductivity less than 1.0 Siemens per meter at 20° C. That is, the body material composition may be an insulator or non-conductive. The body material composition may be less conductive than the sensor sections 110, 118, 122.

As shown, the foil 106 includes three sensor sections: a first sensor section 110, a second sensor section 118, and a third sensor section 122. Any number of sensor sections 110, 118, 122 may be used. Each sensor section 110, 118, 122 includes respective sensor terminals 116, 120, 124. It should be appreciated that in the cross-sectional view, only one set of terminals 116, 120, 124 is shown. The entire foil 106 could include a second set of terminals corresponding to positive and negative ends of the sensor sections 110, 118, 124. Indeed, each sensor section 110, 118, 124 may have a corresponding set of two terminals that terminate at tab section 126. The tab section 126 may only connect to the support structure 104 or continue through the support structure 104 to the housing 102. The tab section 126 may only connect with the support structure 104 on one end, as shown. That is, the foil 106 only has one tab section 126 on one end. As such, the circuit of the sensor sections 110, 118, 122 may be completed with leads to ends of the foil 106.

Figure 2A:
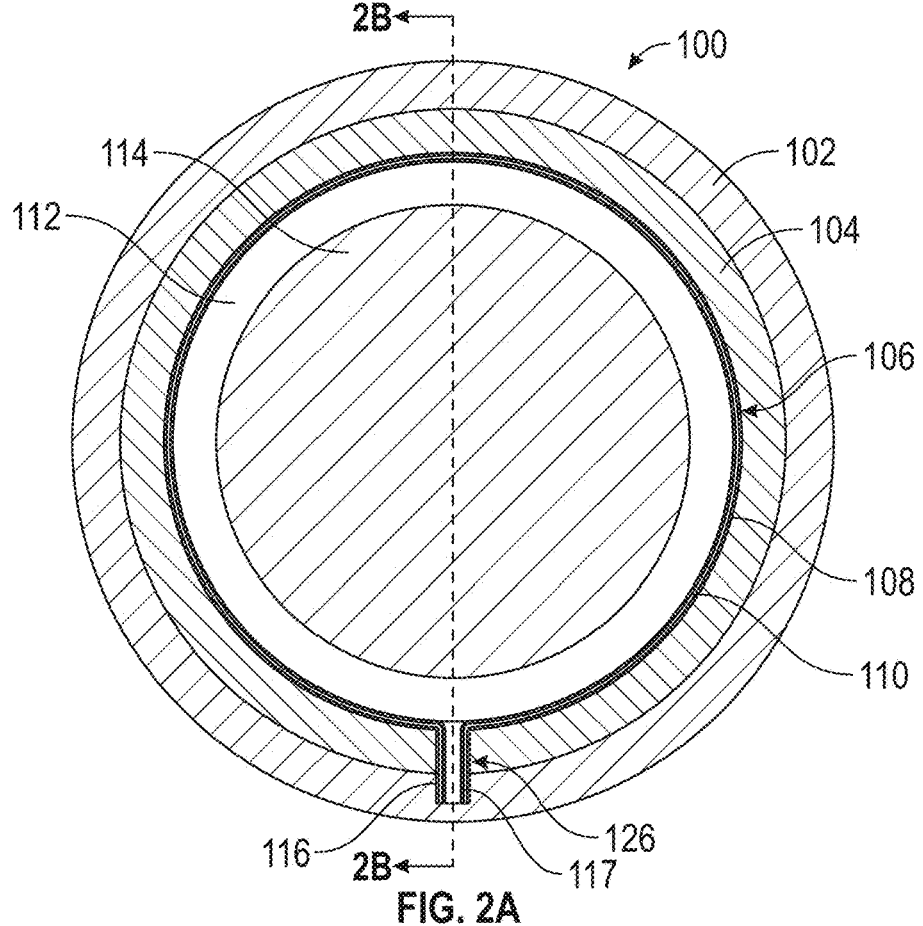
FIG. 2A is a cross-sectional side view through an axis of the foil bearing.
Figure 2B:
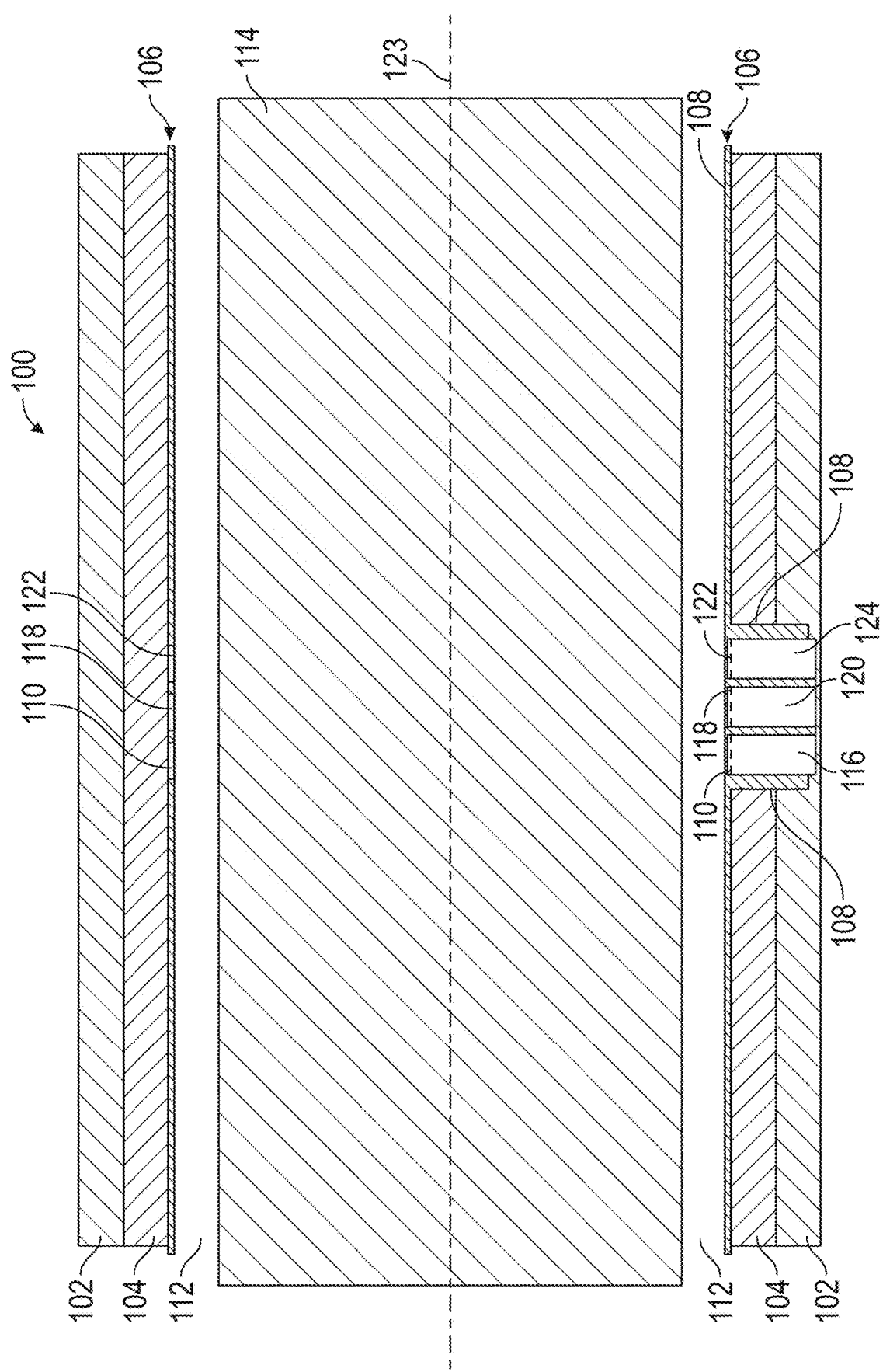
FIG. 2B is a cross-sectional front view of the foil bearing.

Referring to FIGS. 2A-2B, a cross-section side view is shown. Cross-section A begins from a first terminal end of the foil bearing 100 as shown in FIG. 2B. As shown, the foil bearing 100 includes a housing 102, a support structure 104 and a foil 106. The foil 106 may include a body section 108 and a sensor section 110. As shown, the sensor section 110 is formed in a middle portion of the foil 106. It should be appreciated that the sensor section 110 or sensor sections 110, 118, 122, can be situated in any position along a rotational axis 123 of the rotor 114. As shown, the rotor 114, rotates about the rotational axis 123 within the foil 106 as friction forces are reduced by the airgap 112. The foil bearing 100 includes a tab section 126 that protrudes into at least a portion of the support structure 104. It should be appreciated that the tab section 126 may be oriented at any circumferential position along the circumference of foil 106. The tab section 126 defines a first terminal 116 and a second terminal 117 (not shown) associated with the sensor section 110. The foil 106 may further include additional tab sections or partial tab sections that include additional terminals or portions thereof.

As shown in FIG. 2B, a front cross-sectional view of foil bearing 100 is shown. The figure includes the first sensor section 110, the second sensor section 118, and the third sensor section 122 having respective terminals 116, 120, 124. Each of the sensor sections 110, 118, 122 may further include another set of terminals not shown. As shown, the housing 102 surrounds the support structure 104 and the foil 106. The foil 106 includes a body section 108.

Figure 3A:
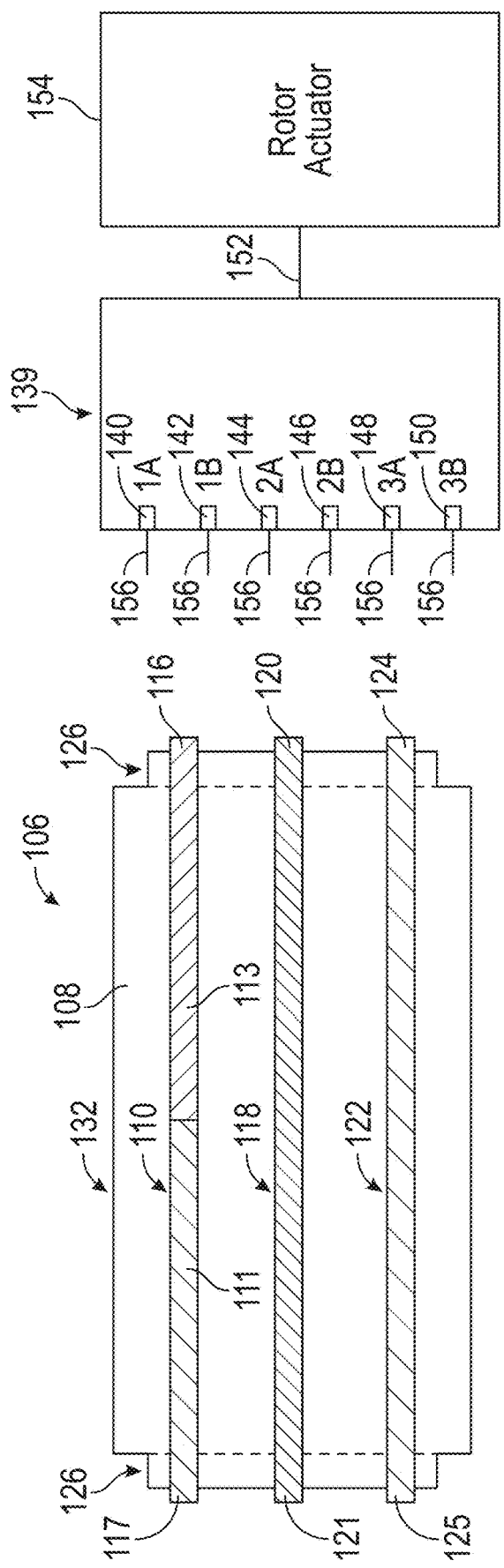
FIG. 3A is a plan view of a foil before round forming.
Figure 3B:
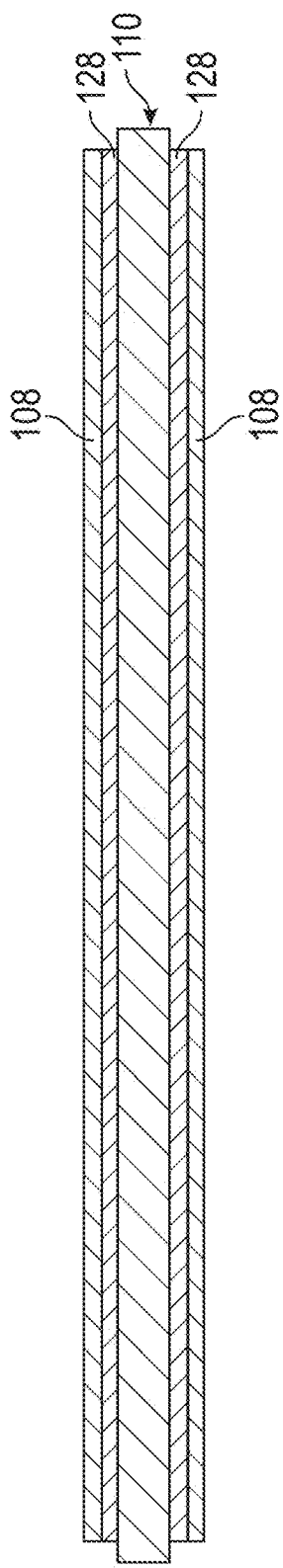
FIG. 3B is a side view of the foil before round forming.

Referring to FIG. 3A-3B, an unrounded, foil sheet 106 is shown. The foil 106 may be created through lamination or additive manufacturing. For example, the foil 106 may have layers of the body section 108, as shown in FIG. 3B stacked and welded to form a substrate. A sensor section 110 may be embedded between layers of body sections 108 or as portions or body section layers 108 to form sensors throughout the foil 106. The layers may be formed through any process of manufacture, including ultrasonic addition manufacturing. The sensor section 110 and the body section 108 may be separated by an insulative layer 128. The insulative layer may be a solid material or a gel or oil.

The foil 106 includes sensor sections 110, 118, and 122. The first sensor section 110 has a conductive material composition that includes a first metallic conductor material 111, disposed distinctly from a second conductor material 113 that are joined to form a thermocouple. The thermocouple may be any material composition known to create a Seebeck effect. That is, a voltage is generated based on the junction of the disparate materials. As one example, the first metallic conductor material 111 may be iron and the second conductor material 113 may be constantan. Thus, the first sensor section 110 may be configured to form a thermocouple having a first terminal 116 and a second terminal 117. The first and second terminals 116, 117 may be conductively connected through wires 156 with a controller 139 and inputs 1A 140 and 1B 142, respectively. As such, the controller 139 may be configured to monitor a temperature of the foil or associated rotor 114 and foil bearing 100 without additional sensory components.

The foil 106 further includes a second sensor section 118. The second sensor section 118 may have a conductive material composition as shown to create a speed sensor. The conductive material composition may have a high electron mobility. As one example, gallium arsenide (GaAs) may be used. As such, the speed sensor may be configured to conduct induced electricity from magnetic fields of the rotor 114 as the rotor 114 rotates within the foil bearing 100. The second sensor section 110 may be configured to form a speed sensor having a first terminal 120 and a second terminal 121. The first and second terminals 120, 121 may be conductively connected through wires 156 with a controller 139 and inputs 2A 144 and 2B 146, respectively. As such, the controller 139 may be configured to monitor a speed of the rotor 114 within the foil bearing 100 without additional sensory components.

The foil 106 further includes a third sensor section 122. The third sensor section 122 may have a conductive material composition as shown to create a vibration or acceleration sensor. The conductive material composition may exhibit piezoelectricity or piezoresistivity. As one example, organic or synthetic crystals may be used. In another example, semiconductor materials may be used. The semiconductor materials may be doped to form such resistors. That is, the conductive material composition of the third sensor section 122 may have a heterogenous composition to form piezoresistors or piezoelectric sources. As such, the vibration sensor of the third sensor section 122 may be configured to generate electricity or resistivity based on the vibrations of the foil bearing 100 or the rotor 114. The third sensor section 122 may have an embedded organization to form fins or ridges to form piezoelectric and piezoresistive configurations. The third sensor section 122 may be configured to form a vibration sensor having a first terminal 124 and a second terminal 125. The first and second terminals 124, 125 may be conductively connected through wires 156 with a controller 139 and inputs 3A 148 and 3B 150, respectively. As such, the controller 139 may be configured to monitor vibrations of the foil bearing 100 and the rotor 114 without additional sensory components.

The controller 139 may include any combination of processors, field programmable gate arrays (FPGA), or application specific integrated circuits (ASIC). The controller may include memory, volatile and non-volatile, operable to store machine instructions from the processors and other processing mechanisms to receive, calculate, and control devices, as necessary. Machine instructions may be stored in any language or representation, including but not limited to machine code, assembly instructions, C, C++, C #, PASCAL, COBAL, PYTHON, JAVA, and RUBY. It should be appreciated that any type of wired or wireless configuration is appreciated for any of the communications from the controller. Wireless protocols such as ZIGBEE, WI-FI, BLUETOOTH, or any other implement may be used. Communications may be realized through any protocol or medium known or unknown.

The controller 139 may include digital or analog outputs to a rotor actuator 154 or alarm panel. The controller 139, may change the operation of the rotor 114 through the rotor actuator 154. The rotor actuator 154 may be a brake system or a control valve configured to change a speed of the rotor 114. The rotor actuator 154 may also be a stop valve or emergency release valve.

Figure 4:
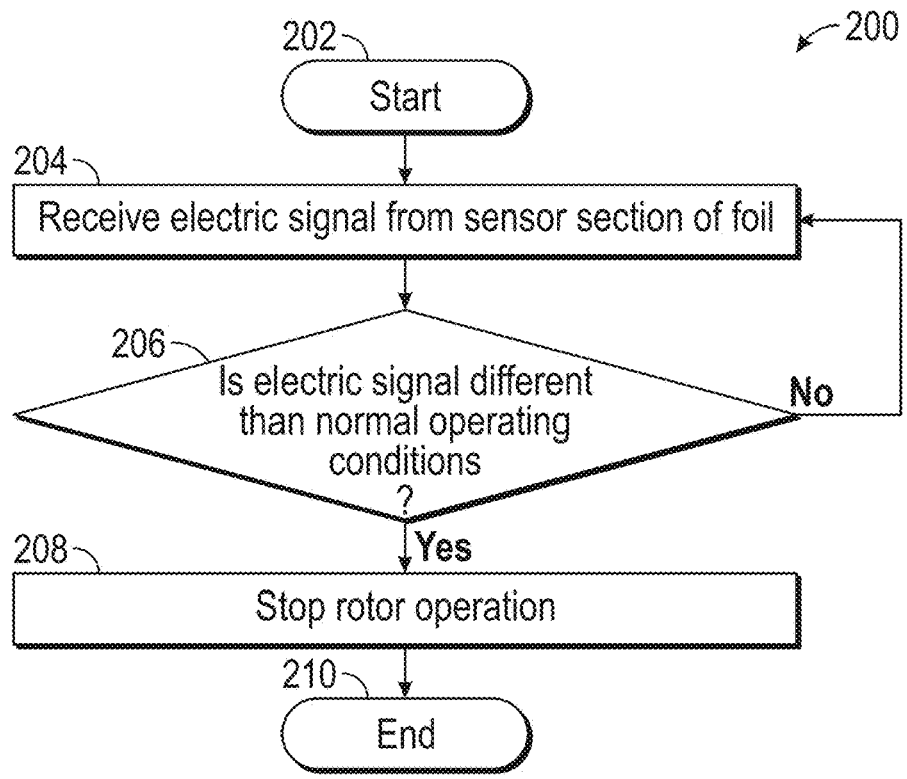
FIG. 4 is a method for operating a rotary machine having a foil described herein.

Referring to FIG. 4, a method 200 for monitoring one of the sensor sections 110, 118, 122 is shown. The method 200 starts in step 202. In step 204, the controller 139 receives an electric signal via inputs 140, 142, 144, 146, 148, 150. The inputs 140, 142, 144, 146, 148, 150 may be digital or analog. If the input signal from one of the sensor sections 110, 118, 122 is different than a normal operating condition in step 206, the controller 139 may stop or otherwise change operation of the rotor 114 in step 208. In step 210, the method repeats or ends. It should be appreciated that any method steps may be repeated, omitted, or rearranged.

Figure 5:
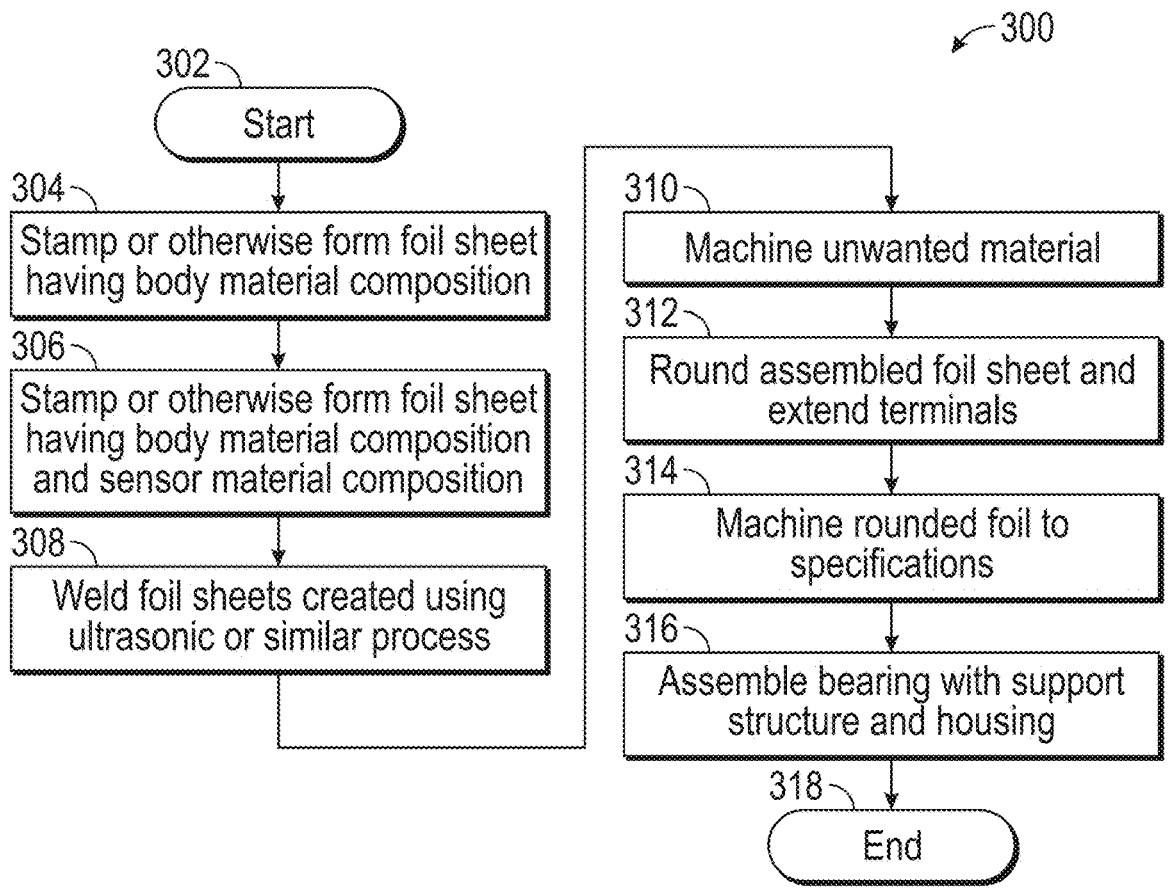
FIG. 5 is a method of manufacture of the foil bearing.

Referring to FIG. 5, a method 300 for manufacturing the foil 106 is shown. The method 300 beings in step 302. In step 304 foil sheets having a body material composition are formed through stamping or machining. In step 306, foil sheets having a body section 108 and sensor sections 110, 118, 122 are formed. The heterogenous sheets may be mechanically joined or individual sections 108, 110, 118, 122 may be positioned near one another. In step 308, the sheets are stacked and welded or bonded using an ultrasonic or other lamination process. The sheets may be arranged to form the foil 106 including a body section 108, and sensor sections 110, 118, 122. In step 310, extraneous or unwanted material is machined and removed. In step 312, the foil sheet 106, as shown in FIG. 3A, is rounded to form a circular foil 106 as shown in FIG. 2A. In step 314, the foil 106 may be machine to remove extraneous material. In step 316, the foil bearing 100 is assembled and associated with rotor 114. In step 318, the method of manufacture ends. It should be appreciated that any method steps may be repeated, omitted, or rearranged.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A foil bearing comprising:
   a housing;
   a support structure associated with the housing; and
   a foil circumscribed at least in part by the support structure and spaced from the housing by the support structure, the foil including
   a body section having a body material composition, a sensor section having a conductive material composition, the sensor section having a circumferential portion surrounded at least in part by the body section, and a tab section that protrudes into the support structure and defines a first terminal and a second terminal associated with the sensor section.

2. The foil bearing of claim 1, wherein the circumferential portion extends in a circumferential direction about the foil and the tab section is configured to prevent movement of the foil in the circumferential direction about the support structure.

3. The foil bearing of claim 1, wherein the conductive material composition includes a first metallic conductor material disposed distinctly from a second conductor material joined to form a thermocouple of the sensor section about the circumferential portion.

4. The foil bearing of claim 1, wherein the conductive material composition is homogenous.

5. The foil bearing of claim 4, wherein the sensor section forms a speed sensor configured to conduct current induced from magnetic fields.

6. The foil bearing of claim 4, wherein the sensor section forms an acceleration sensor configured to generate a voltage from forces imparted on the conductive material composition.

7. The foil bearing of claim 1 further comprising, an insulator disposed between the body section and the sensor section.

8. The foil bearing of claim 1, wherein a body material composition conductivity of the body section is less than 1.0 Siemens per meter at 20° C. and a conductive material composition conductivity of the sensor section is greater than 1.0 Siemens per meter at 20° C.

9. The foil bearing of claim 1, wherein the support structure is a bump foil.

10. A bearing measurement system comprising:
a foil bearing as recited in claim 1;
a rotor circumscribed by the foil; and
a controller operable to receive an electric signal from the sensor section, and responsive to a difference between the electric signal and a normal operating condition exceeding a predetermined threshold, operate the rotor commensurate with the difference.

11. The bearing measurement system of claim 10, wherein the operation of the rotor commensurate with the difference includes stopping the rotor.

12. The bearing measurement system of claim 10, wherein the electric signal is a voltage generated by the sensor section.

13. The bearing measurement system of claim 12, wherein the sensor section forms a thermocouple.

14. The bearing measurement system of claim 13, wherein the normal operating condition is a bearing temperature threshold.

15. The bearing measurement system of claim 12, wherein the sensor section is a solid conductor.

16. The bearing measurement system of claim 15, wherein the normal operating condition is a speed of the rotor.

17. The bearing measurement system of claim 12, wherein the sensor section forms a piezoelectric sensor.

18. The bearing measurement system of claim 17, wherein the normal operating condition is a normal machine vibration threshold.

19. A foil bearing comprising:
a housing;
a support structure associated with the housing; and
a foil circumscribed at least in part by the support structure and spaced from the housing by the support structure, the foil including
a body section having a body material composition, and
a first sensor section having a first conductive material composition, the first sensor section having a first circumferential portion surrounded at least in part by the body section and
a second sensor section having a second conductive material composition, the second sensor section having a second circumferential portion surrounded at least in part by the body section and
a third sensor section having a third conductive material composition, the third sensor section having a third circumferential portion surrounded at least in part by the body section and
a tab section that protrudes into the support structure and defines respective first terminals and second terminals associated with the first sensor section, the second sensor section, and the third sensor section.

20. The foil bearing of claim 19, wherein the first sensor section is parallel to the second sensor section and the first sensor section is parallel to the third sensor section.

* * * * *